United States Patent [19]

Pharms

[11] Patent Number: 4,718,932
[45] Date of Patent: Jan. 12, 1988

[54] METHOD FOR MAKING AN ELECTRICALLY HEATABLE WINDSHIELD

[75] Inventor: Eugene P. Pharms, Romulus, Mich.

[73] Assignee: Ford Motor Company, Dearborn, Mich.

[21] Appl. No.: 934,984

[22] Filed: Nov. 24, 1986

[51] Int. Cl.$^4$ .................... C03C 17/23; C03B 23/023
[52] U.S. Cl. ............................................. 65/42; 65/55; 65/60.2; 148/6.3; 427/108
[58] Field of Search ............... 65/42, 54, 55, 64, 60.2, 65/106, 107; 427/108, 109, 110; 148/6.3; 204/192.29, 192.26, 192.15

[56] References Cited

U.S. PATENT DOCUMENTS

| | | | |
|---|---|---|---|
| 3,772,075 | 11/1973 | Tarhopol | 427/108 |
| 4,109,044 | 8/1978 | Marriott | 65/107 |
| 4,462,883 | 7/1984 | Hart | 204/192.26 |
| 4,548,691 | 10/1985 | Dietrich | 204/192.29 |
| 4,654,067 | 3/1987 | Ramus | 65/60.2 |

Primary Examiner—Kenneth M. Schor
Attorney, Agent, or Firm—William E. Johnson; Clifford L. Sadler

[57] ABSTRACT

This specification teaches a method of manufacturing a curved windshield with an electrically conductive film thereon. The method includes the steps of placing an electrically conductive film, an oxidizable metal layer, and an oxidized metal layer in layered relationship on a flat glass sheet. A glass templet is cut from the coated sheet and electric bus bars are applied and dried on the electrically conductive film on the coated glass templet. A glass templet is cut from an uncoated glass sheet and the two so-formed templets are united with the coating of the one sheet exposed to the ambient. The glass sheets are heated and bent into curved configuration. Thereafter, a laminating interlayer is placed between the glass templets and the glass templets are laminated together.

3 Claims, 1 Drawing Figure

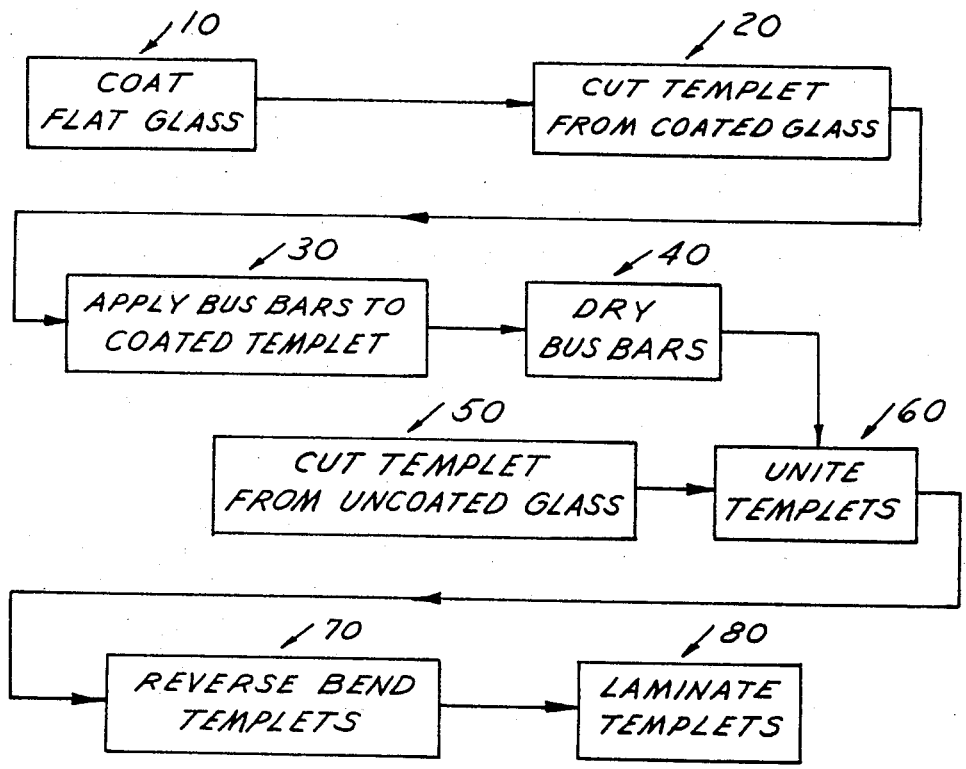

METHOD FOR MAKING AN ELECTRICALLY HEATABLE WINDSHIELD

TECHNICAL FIELD

This application is directed to a method of making an electrically heatable windshield which finds principal use as the windshield vision unit of a vehicle such as a motor vehicle. The electrically heatable windshield is one which may be defogged and deiced by application of an electric current to an electrically conductive coating within the windshield of laminated construction. Generally, the electrically conductive coating is transparent to radiation in the visible wavelength range.

BACKGROUND AND PRIOR ART STATEMENT

Motor vehicles, as presently manufactured, are equipped for defogging and deicing windshields. Generally, these systems depend upon heat generated in the internal combustion engine of the vehicle and transferred to the engine's cooling system to be blown as warm air across the interior of the windshield to accomplish the defogging and deicing thereof. In such a case, of course, it is readily apparent that there is a period of time between the starting of an engine of a vehicle and the time that sufficient heat is being generated in its cooling system in order to provide a defogging and deicing of the vehicle's windshield. Depending upon the exact temperature conditions and the time the vehicle has been sitting idle without its engine running, the period of time before sufficient heat is available to accomplish this defogging and deicing function can be up to 10 minutes or more.

Ford Motor Company has recently introduced an electrically heated windshield in which heat is generated from electrical energy to accomplish a relatively rapid defrost and deicing of the vehicle's windshield. The electrically heated windshield is independent of the normal heating and defrosting system contained in the motor vehicle. The system is one which has an electrically conductive coating placed on the windshield prior to lamination of the two glass templets to form the windshield.

The specific method presently employed by Ford Motor Company in manufacturing its electrically heated windshields is set forth in U.S. patent application Ser. No. 823,233, filed Jan. 28, 1986, entitled "Method For Making An Electrically Heatable Windshield." This application has matured into U.S. Pat. No. 4,654,067. The specification of that application is hereby incorporated by reference.

The mentioned application teaches a process in which the two glass templets which are to form the windshield are bent into their curved configurations prior to placement of the conductive coating on one of the glass templets. The coating of the glass templets takes place at a relatively slow speed because intricate magnetron sputtering equipment needed to be designed to place a thin conductive coating on a curved glass sheet. The present equipment used by Ford Motor Company is one in which approximately one curved part may be coated per minute.

One way of improving the productivity of the process would be to coat the glass templets when they were in a flat conditions. In a flat condition, approximately seven parts per minute may be coated, which would mean an increase of six parts per minute. The problem, however, is that no one knew how to bend a coated glass template from its flat condition to a curved condition without oxidizing the conductive layer, thereby ruining it from an electrical standpoint.

No search was conducted on the subject matter of this specification in the U.S. Patent and Trademark Office or in any other search facility. The only prior art that I am aware of is that which has been discussed above.

It is a principal object of this invention to provide a method of manufacturing a curved windshield in which the glass bracket having the electrically conductive coating thereon is bent after the coating has been applied.

DISCLOSURE OF THE INVENTION

My invention is directed to a method of manufacturing a curved windshield and, more particularly, to a method of manufacturing a curved windshield with an electrically conductive film thereon.

In accordance with the teachings of the method of my invention, an electrically conductive film is placed on a flat glass sheet.

An oxidizable metal layer is placed on the electrically conductive film. The oxidizable metal layer is of such thickness that when the flat glass sheet is subjected to a heating operation for the purpose of bending the same, the oxidizable metal layer will be oxidized through its width as the heating of the glass sheet is being terminated.

An oxidized metal layer is placed on the oxidizable metal layer.

A glass template is cut from the coated glass sheet. A glass template is also cut from an uncoated glass sheet. Electrically conductive bus bars are applied to the electrically conductive film on the glass template. The bus bars are dried to bond the bus bars to the electrically conductive film on the glass template.

The coated and uncoated templets are united with the coated side of the coated template being exposed to the air.

The united glass templets are heated to a temperature whereat the united glass templets are bendable. The united glass templets are bent. The oxidation of the oxidizable metal layer during the heating of the united glass templets protecting the electrically conductive film on the coated glass template.

A laminating interlayer is placed between the glass templets, the electrically conductive film being laminated against the laminating interlayer. The glass templets are laminated with the laminating interlayer, thereby to achieve a shaped laminated windshield which is heatable by the flow of electrical energy therethrough.

The bending in this method is a so-called "reverse" bending because a surface which is to be laminated against the laminating interlayer is actually exposed to the ambient during the bending operation. In a normal bending operation, the surfaces of the two glass templets which are to contact the laminating interlayer are in juxtaposition with one another and are not exposed to the ambient throughout their entire extent.

In the preferred embodiment of my method, the metal of the oxidizable metal layer and the metal of the oxidized metal layer are generally the same. Suitable metals include zinc and titanium.

BRIEF DESCRIPTION OF THE DRAWINGS

The novel features that are considered characteristic of the invention are set forth with particularity in the appended claims. The invention itself, however, as to its organization and its method of operation, together with additional objects and advantages thereof, will best be understood from the following description of specific embodiments when read in connection with the accompanying drawing which is a schematic outline of the steps involved in the method of my invention.

BEST MODE AND INDUSTRIAL APPLICABILITY

The following description is what I consider to be a preferred embodiment of the method for manufacturing a curved windshield with an electrically conductive film thereon. The following description also sets forth what I now contemplate to be the best mode of carrying out my method of manufacturing a curved windshield with an electrically conductive film thereon. This description is not intended to be a limitation upon the broader principles of my method and, while preferred materials are used in my method in accordance with the requirements of the laws, it does not mean that other materials cannot be used in my method.

My method of manufacturing a curved windshield with an electrically conductive film thereon is initiated in the following manner, as is graphically depicted in the drawing associated with this specification.

The first step of my method, generally identified by the numeral 10, is one in which flat glass sheet is coated with an electrically conductive film. In the preferred embodiment, this coating operation takes place in a magnetron sputtering chamber, well known in the art, which in the preferred embodiment applies two coating layers to the flat glass. A first coating is a layer of zinc oxide having a thickness of about 480 angstroms. The second coating is applied over the zinc oxide layer and this coating is silver. The silver has a thickness of about 120 angstrom and it is the conductive material for the electrically conductive coating.

In accordance with the teachings of the method of my invention, the coating step 10 also includes the application of an oxidizable metal layer on the electrically conductive film as well as the placement of an oxidized metal layer on the oxidizable metal layer. In accordance with the teachings of the preferred embodiment of this invention, the oxidizable metal layer has a thickness of 75 angstroms and is formed from zinc. The oxidized metal layer is zinc oxide and it has a thickness of about 440 angstroms. Zinc may be sputtered in a magnetron sputtering operation by using zinc as the target material in carrying out the sputtering operation in an inert atmosphere. Zinc oxide may be generated by carrying out the sputtering of zinc in an oxygen containing atmosphere as is well known to those skilled in the art.

The reader is referred to my U.S. application Ser. No. 934983, filing date 11-24-86 filed on even date herewith, entitled "Method of Manufacturing a Curved Glass Sheet With a Coating Film Thereon", for additional details of this coating operation and purpose for such coating. The main requirement of the oxidizable metal layer is that it be sufficiently thick that the layer is oxidizing through its thickness and that such oxidation is complete through the thickness at or very near the time the heating of the glass sheet having the coating thereon is terminated prior to the bending thereof.

When the oxidizable layer has been oxidized, in the preferred embodiment we would now have a layer of zinc oxide on either side of the layer of silver. The purpose of the zinc oxide is to act to de-reflect light that would be reflected by the silver conductive layer. In this manner the two coatings of zinc oxide act to increase the light transmission of the coating, thereby resulting in a transparent conductive film.

After the coating operation, the second step of my method, generally identified by the numeral 20, is one in which a glass templet is cut from the coated glass sheet.

In accordance with the teachings of the preferred embodiment of this invention, the coated glass sheet will form the outer glass sheet in the laminated construction. The electrically conductive film will be laminated against the laminating interlayer in that final operation. Thus, because the coated glass sheet is going to form the outside of the windshield, it is generally larger in size than the glass templet which will form the inside of the windshield.

After the glass templet has been formed from the glass sheet, bus bars are applied to the coated side of the glass templet in the next step in the method of my invention, generally identified by the numeral 30. The bus bars are generally applied in a silk screening operation as is well known in the art. The bus bars are generally made from a silver ceramic material as is also known in the art. Normally, the bus bars are silk screen printed as stated above, and the printing material used is a liquid. For example, a suitable material is 86% silver, 5% borosilicate frit, 5% pine oil, and 3% polycarbonate acetate.

In the next step of my method, generally identified by the numeral 40, the bus bar material is dried to bond the bus bars to the electrically conductive film on the glass templet. The drying operation is generally carried out at a temperature in a range of 1000° F. for a period of five minutes. Once again, the specific drying time and temperature are dependent upon the exact materials used to print the bus bars on the surface of the coated glass templet and the size and thickness of the glass templet. The drying is sufficient to bond the bus bar material to the coated glass templet so that the coated glass templet may be handled in normal handling operations without any of the bus bar materials being removed therefrom.

While the processing steps 10 through 40 are being carried out, another process step, generally identified by the numeral 50, may be carried out. In this step a glass templet is cut from uncoated glass. In accordance with the teachings of the preferred embodiment, the templet cut from the uncoated glass will be the interior of the windshield when laminated. This uncoated glass templet will be slightly smaller in size but of the same general shape as the templet cut from the coated glass.

The next step of the method of my invention, is generally designated by the numeral 60. In this step, the templets are united. However, in accordance with the teachings of the method of my invention, the two glass templets are united so that the surface of the coated glass templet having the coating thereon is exposed to the oxygen ambient. For example, if the heating and bending operation takes place in a normal windshield bending lehr, the inside or uncoated glass sheet will be on the bottom of the bending fixture and the coated glass sheet will be on top of the uncoated glass sheet with its coated surface facing upwardly. Then, during the heating and bending operation, the two glass sheets are formed into complementary shape so that they may be subsequently laminated together. However, because the inside surface (that is, the surface of the coated glass templet which is to be laminated to the laminating interlayer) is exposed, this process is called a reverse bending operation. Normally, the larger glass sheet would be in engagement with the bending fixture with the smaller glass sheet lying thereover. In accordance with the teachings of the method of my invention, the smaller glass sheet lies on the bending fixture, and the larger glass sheet lies thereover with the coated surface exposed.

The reverse bending step is shown in the schematic diagram and is generally identified by the numeral 70. The reverse bending process comes in two steps. The first step is a heating of the glass templets and the second step is a bending of the glass templets.

In accordance with the teachings of a preferred embodiment of the method of my invention, the glass templets are heated to a temperature sufficient to soften the same so that they may be bent to the desired radius as a paired unit while on the glass bending fixture. Such a bending operation is well known to those skilled in the art, although the normal bending operation is different than the reverse bending operation I require for my method which has been detailed above. During this bending operation, there is relative movement between the juxtaposed surfaces of the two glass templets.

In the last step of the method of my invention, the templets are laminated together. This is accomplished by placing a laminating interlayer between the glass templets. In this case, the coated surface of the coated templet is placed in contact with the laminating interlayer. The glass templets are then laminated together by applying heat and pressure to the united glass templets with the interposed laminating material therebetween. In such a laminating operation, the laminating material is rendered transparent and is effective to bond the two glass templets into a single laminated windshield construction in which the surfaces of the glass sheet contacting the laminating material are in bonding relationship with the material in order to form a laminated sandwich.

Generally, cut out portions are provided in the glass templets so that electrical contact can be made with the bus bars on the laminated windshield. When electrical contact is made to such areas and such areas are connected to a suitable source of electrical energy as, for example, the electrical system of the motor vehicle, the windshield may be heated by passing electrical current through the electrically conductive coating thereon. Passage of electrical energy, of course, generates a resistence heating of the conductive coating which, in turn, allows a defrosting and deicing of the windshield in the vehicle as is required. The design of the electrical supply system and connections necessary is well known to the skilled artisan.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention. For example, titanium is another suitable metal to be used in forming the oxidizable metal layer and the oxidized metal layer.

I claim:

1. A method of manufacturing a curved windshield with an electrically conductive film thereon which comprises the steps of:

placing an electrically conductive film on a flat glass sheet;

placing an oxidizable metal layer on said electrically conductive film, said oxidizable metal layer being of such thickness that when the flat glass sheet is subjected to a heating operation of a specific predetermined time and temperature for the purpose of bending the same, said oxidizable metal layer will be oxidized throughout its width as the heating of the glass sheet is being terminated;

placing an oxidized metal layer on said oxidizable metal layer;

cutting a glass templet from the resulting coated glass sheet;

applying electrically conductive bus bars to said electrically conductive film on said glass templet;

drying said bus bars to bond said bus bars to said electrically conductive film on said glass templet;

cutting a glass templet from an uncoated glass sheet;

uniting said coated and uncoated glass templet in a manner such that said coating on said coated glass templet is exposed to the ambient;

heating said glass templet to a temperature whereat said united glass templets are bendable using said specific time and temperature;

reverse bending said united glass templets, said oxidation of said oxidizable metal layer during said heating of said united glass templets protecting said electrically conductive film;

placing a laminating interlayer between said glass templets with the coating on the coated glass templet being placed in contact with the laminating interlayer; and laminating said glass templets with said laminating interlayer thereby to achieve a shaped laminated windshield which is heatable by the flow of electrical energy therethrough.

2. The method of claim 1, wherein the metal of said oxidizable metal layer and said oxidized metal layer are the same.

3. The method of claim 2, wherein said metal is zinc.

* * * * *